United States Patent
Atarashi et al.

(10) Patent No.: US 6,818,297 B1
(45) Date of Patent: Nov. 16, 2004

(54) WHITE POWDER AND METHOD FOR PRODUCTION THEREOF

(75) Inventors: Takafumi Atarashi, Tokyo (JP); Kiyoshi Hoshino, Tokyo (JP); Katsuto Nakatsuka, Miyagi (JP)

(73) Assignees: Nittetsu Mining Co., Ltd., Tokyo (JP); Katsuto Nakatsuka, Miyagi (JP)

( * ) Notice: Subject to any disclaimer, the term of this patent is extended or adjusted under 35 U.S.C. 154(b) by 0 days.

(21) Appl. No.: 09/958,545

(22) PCT Filed: Apr. 12, 2000

(86) PCT No.: PCT/JP00/02392

§ 371 (c)(1),
(2), (4) Date: Oct. 11, 2001

(87) PCT Pub. No.: WO00/61496

PCT Pub. Date: Oct. 19, 2000

(30) Foreign Application Priority Data

Apr. 13, 1999 (JP) ............................................ 11/105568
Mar. 24, 2000 (JP) ........................................ 2000/084258

(51) Int. Cl.⁷ .............................................. B32B 15/02
(52) U.S. Cl. ..................... 428/403; 428/407; 427/407.1
(58) Field of Search ................................ 428/403, 407; 427/407.1

(56) References Cited

U.S. PATENT DOCUMENTS 5,118,352 A * 6/1992 Noguchi ...................... 106/436
5,945,218 A * 8/1999 Nakao et al. ................. 428/403

FOREIGN PATENT DOCUMENTS

| JP | 4-269804 | 9/1992 | ............. H01F/1/06 |
| JP | 2000-128544 | 5/2000 | ............ C01G/49/02 |
| JP | 2000-150218 | 5/2000 | ............ H01F/1/11 |

* cited by examiner

*Primary Examiner*—Holly Rickman
(74) *Attorney, Agent, or Firm*—Sughrue Mion, PLLC

(57) ABSTRACT

A white powder characterized by comprising base particles having on the surface thereof at least one coating film comprising a crystallized-particle aggregate which is capable of imparting a white color based on the scattering reflection of light and which comprises crystallized particles and has voids among the crystallized particles; a white powder characterized in that it comprises base particles having on the surface thereof at least one coating film comprising a crystallized-particle aggregate which comprises crystallized particles and has voids among the crystallized particles, and that a white color is imparted thereto based on the scattering reflection of light occurring between the surface of the crystallized particles and the voids; and processes for producing these.

18 Claims, 1 Drawing Sheet

WHITE POWDER AND METHOD FOR PRODUCTION THEREOF

TECHNICAL FIELD

The present invention relates to a white powder and a process for producing the same. More particularly, the invention relates to a white powder which has higher lightness (whiteness) than conventional ones and is usable for a variety of purposes such as color inks, color fillers for plastics/paper, color toners, color inks for ink-jet printers, inks and toners for forgery prevention, general coating compositions, powder pigments/coating compositions for motor vehicles, coating compositions for electrostatic coating, pigments for cosmetics, pigments for art objects such as craftworks and ceramic art objects, pigments for (to be deposited on) fibers, pigments (especially for magnetic shielding) and fillers for decorative papers/decorative sheets, catalytic coating compositions, and heat-resistant coating compositions, and to a process for producing the same.

BACKGROUND ART

A technique is known which comprises coating a powder with another substance to impart a new function thereto in order to use the powder in various applications.

For example, a conventional, one-component type, magnetic color toner or magnetic color ink is produced by forming a colored layer on base particles having magnetics, e.g., an iron powder.

For obtaining a clear color image with this one-component type magnetic color toner or magnetic color ink, it is necessary to color the magnetic toner or ink itself in a bright tint. However, even when a colored layer is formed directly on the surface of the magnetic particles serving as a base, the coated particles as a whole assume a dark color because the magnetic particles are generally black.

In order to overcome the drawback, the following have been proposed: a technique in which a metal film is formed on base particles to make the powder white based on the reflective function of the film (Unexamined Published Japanese Patent Applications Nos. 3-271376 and 3-274278); a technique which comprises dispersing base particles into a metal alkoxide solution and hydrolyzing the metal alkoxide to thereby form a metal oxide film having an even thickness of from 0.01 to 20 μm on the surface of the base particles (Unexamined Published Japanese Patent Application No. 6-228604); a functional powder having on the surface thereof thin films of a metal oxide arranged alternately with thin films of a metal (Unexamined Published Japanese Patent Application No. 7-90310); and a technique for producing a powder having a denser and stabler multilayered metal oxide film which comprises heat-treating a powder coated with a multilayered metal oxide film (International Publication WO 96/28269).

In particular, in the case of the powders described above having two or more layers of a metal oxide film or metal film, a special function can be imparted thereto by relating the thickness of each layer. For example, when coating films differing in refractive index are formed on the surface of base particles each in a thickness corresponding to one-fourth the wavelength of an incident light, a white powder can be produced which reflects all the incident light. It is suggested that the white powder thus obtained can be used to obtain a white magnetic toner or ink, and that a color magnetic toner or ink colored in a bright tint can be produced by further forming a colored layer on the surface of the white powder.

However, the technique described in Unexamined Published Japanese Patent Applications Nos. 3-271376 and 3-274278, in which a metal film is formed, has the following drawbacks. The reflectance of a powder can be heightened to the reflectance inherent in the metal by increasing the number of films or film thickness and the powder can be thus whitened. However, a higher degree of whiteness cannot be expected after the number of films or the film thickness has reached to a certain degree. In addition, the whiteness obtained is insufficient.

Furthermore, in the techniques described in Unexamined Published Japanese Patent Applications Nos. 6-228604 and 7-90310 and International Publication WO 96/28269, the larger the number of films or film thickness, the higher the reflectance and, hence, the higher the whiteness. Thus, the properties of the film are enhanced. However, the larger the number of films or film thickness, the more the properties of the base particles are diminished. For example, in the case where a magnetic powder is used as base particles, magnetism becomes lower as the number of films or the film thickness increases.

In other words, the following can be said. In the white powders obtained by the techniques described above, it is necessary to reduce the number of films or the film thickness for taking advantage of properties possessed by the base particles. However, there has been a fear that the desired whiteness may not be obtained when the number of films or the film thickness is reduced.

DISCLOSURE OF THE INVENTION

Accordingly, an object of the invention is to overcome the drawbacks of the conventional techniques described above and to provide a white powder which has high whiteness while retaining properties of the base particles, more specifically one which has high whiteness even when it has a relatively small number of films with a relatively small thickness so as to take advantage of properties of the base particles. Another object of the invention is to provide a process for producing the white powder.

The present inventors made intensive investigations. As a result, they have found that a film-coated powder which has been whitened based on scattering reflection can be obtained by forming at least one coating layer comprising a crystallized-fine-particle aggregate comprising crystallized fine particles and having voids among the crystallized fine particles. Thus, the inventors have succeeded in accomplishing the objects described above.

Namely, the invention relates to the following (1) to (20).

(1) A white powder characterized by comprising base particles having on the surface thereof at least one coating film comprising a crystallized particle aggregate which is capable of imparting a white color based on the scattering reflection of light and which comprises crystallized particles and has voids among the crystallized particles.

(2) A white powder characterized in that it comprises base particles having on the surface thereof at least one coating film comprising a crystallized-particle aggregate which comprises crystallized particles and has voids among the crystallized particles, and that a white color is imparted thereto based on the scattering reflection of light occurring between the surface of the crystallized particles and the voids.

(3) The white powder as described in (1) or (2) above, characterized in that the crystallized particles are ones irregular in particle diameter.

(4) The white powder as described in (1) or (2) above, characterized in that the coating film is a multilayered film.

(5) The white powder as described in (1) or (2) above, characterized by having, on the surface of the coating film, a coating film comprising particles capable of filling up the voids present in that surface.

(6) The white powder as described in (1) or (2) above, characterized in that the coating film is a high-refractive-index film.

(7) The white powder as described in (5) above, characterized in that the coating film comprising particles capable of filling up the voids present in that surface is a silica film or a titania film.

(8) The white powder as described in (1) or (2) above, characterized in that the coating film is one formed by forming solid-phase particles in an aqueous solution to coat the base particles with the solid-phase particles and then burning the coated base particles.

(9) The white powder as described in (8) above, characterized in that before the burning is conducted, the coating layer is coated with particles capable of constituting a film which fills up the voids present in the surface of the coating layer.

(10) The white powder as described in (1) or (2) above, characterized in that the coating layer is one formed by adhering crystallized particles to the surface of a base powder in a liquid containing the crystallized particles and the base powder dispersed therein.

(11) A process for producing a white powder, characterized by coating the surface of base particles with at least one coating film comprising a crystallized-particle aggregate which is capable of imparting a white color based on the scattering reflection of light and which comprises crystallized particles and has voids among the crystallized particles.

(12) A process for producing a white powder, characterized by coating the surface of base particles with at least one coating film comprising a crystallized-particle aggregate which comprises crystallized particles and has voids among the crystallized particles to thereby impart a white color thereto based on the scattering reflection of light occurring between the surface of the crystallized particles and the voids.

(13) The process as described in (11) or (12) above, characterized in that the crystallized particles are ones irregular in particle diameter.

(14) The process as described in (11) or (12) above, characterized in that the coating film is a multilayered film.

(15) The process as described in (11) or (12) above, characterized by coating the surface of the coating layer with a coating film comprising particles capable of filling up the voids present in that surface.

(16) The process as described in (11) or (12) above, characterized in that the coating film is a high-refractive-index film.

(17) The process as described in (15) above, characterized in that the coating film comprising particles capable of filling up the voids present in that surface is a silica film or a titania film.

(18) The process as described in (11) or (12) above, characterized by forming solid-phase particles in an aqueous solution to coat the base particles with the solid-phase particles and then burning the coated base particles to thereby form the coating film.

(19) The process as described in (18) above, characterized in that before the burning is conducted, the coating film is coated with particles capable of constituting a film which fills up the voids present in the surface of the coating film.

(20) The process as described in (11) or (12) above, characterized in that the coating layer is one formed by adhering crystallized particles to the surface of a base powder in a liquid containing the crystallized particles and the base powder dispersed therein.

BEST MODE FOR CARRYING OUT THE INVENTION

The white powder of the invention comprises base particles having on the surface thereof one or more coating films, at least one of which is a film comprising an aggregate of crystallized particles (hereinafter referred to also as crystallized fine particles) which comprises crystallized fine particles and has voids among the crystallized fine particles (hereinafter, the film is also referred to simply as a film constituted of crystallized fine particles). Due to this constitution, the coating film has a large difference in refractive index between the surface of the crystallized fine particles and the voids to thereby cause the scattering reflection of light and enhance a reflective effect. It has thus become possible to provide a functional powder having excellent lightness (whiteness).

Figure 1:
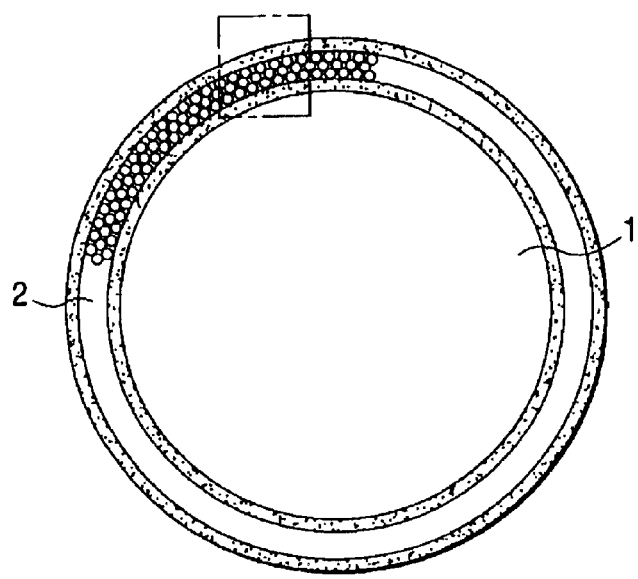
FIG. 1 is a sectional view of one embodiment of the white powder of the invention.
Figure 2:
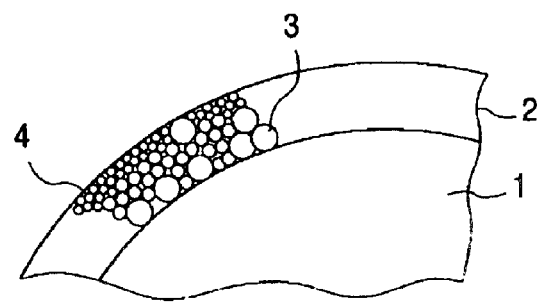
FIG. 2 is an enlarged sectional view of the film 2 constituted of crystallized fine particles which is possessed by the white powder shown in FIG. 1.

FIG. 1 is a sectional view of one embodiment of the white powder of the invention, which comprises base particles 1 having on the surface thereof a film 2 constituted of crystallized fine particles. FIG. 2 is an enlarged sectional view of the film 2 constituted of crystallized fine particles which is possessed by the white powder shown in FIG. 1.

As shown in FIG. 1 and FIG. 2, the film 2 constituted of crystallized fine particles has voids among the crystallized fine particles 3. Because of this, the film 2 has a large difference in refractive index between the surface of the crystallized fine particles 3 and the voids to thereby cause the scattering reflection of light. Thus, the powder can have high lightness (whiteness). The intenser the scattering reflection, the higher the lightness (whiteness) of the powder.

The crystallized fine particles 3 contained in the film 2 preferably have a high refractive index and preferably are irregular in particle diameter.

Lightness can be regulated by regulating the amount and particle diameter of the crystallized fine particles in the film.

However, care should be taken in designing the particles because there are cases where scattering and interference may occur simultaneously depending on the particle diameter thereof to cause the coated powder to assume a hue other than white due to the interference.

Especially in the case whose the film-coated powder obtained has an intense monochromatic spectral color like opal, it is thought that the crystallized particles in the film have an even diameter (about from one-fourth the wavelength of light to the wavelength thereof), resulting in interference by the crystallized fine particles.

In this case, the particle diameters of the crystallized fine particles in the film are not particularly limited as long as the particles cause Mie scattering, and are preferably from 1 to 500 nm, more preferably from 50 to 500 nm, and even more preferably from 50 to 300 nm. If the particle diameters thereof are smaller than 1 nm, the particles, even in a film form, transmit light and, hence, there are cases where the coated powder has the color of the underlying base particles. Conversely, particle diameters thereof larger than 500 nm are undesirable in that coloration by the interference described above occurs due to light reflected by particles and that the film is brittle and is apt to peel off. Furthermore, the crystallized fine particles preferably have irregular particle diameters extensively distributing in the range of from 10 to 500 nm.

Even when the crystallized fine particles in the film are in contact with other fine particles or with another film, they can be distinguished by shape such as grain boundary.

On the other hand, the preferred range of the thickness of each film constituted of crystallized fine particles described above varies depending on the size of the particles to be used as a base. The range thereof is preferably from 0.05 $\mu$m to 0.5 $\mu$m for base particles of from 0.1 $\mu$m to 1 $\mu$m, from 0.05 $\mu$m to 2 $\mu$m for base particles of from 1 $\mu$m to 10 $\mu$m, and from 0.05 $\mu$m to 3 $\mu$m for base particles of 10 $\mu$m or larger.

The preferred range of the total thickness of the above-described films constituted of crystallized fine particles also varies depending on the size of the particles to be used as a base. The range thereof is preferably from 0.1 $\mu$m to 3 $\mu$m for base particles of from 0.1 $\mu$m to 1 $\mu$m, from 0.1 $\mu$m to 5 $\mu$m for base particles of from 1 $\mu$m to 10 $\mu$m, and from 0.1 $\mu$m to 10 $\mu$m for base particles of 10 $\mu$m or larger.

Furthermore, the white powder of the invention preferably has, on the surface of the film 2 constituted of crystallized fine particles 3 and having voids, a dense coating film constituted of particles 4 capable of filling up the voids present in that surface (hereinafter the particles are referred to also as ultrafine particles) (hereinafter this coating film is also referred to simply as dense film), as shown in FIG. 2. For example, in the case where a white powder having as the outermost layer a film constituted of crystallized fine particles such as that described above in used as a pigment powder for a toner, coating composition, etc., the resin of the toner or the vehicle of the coating composition infiltrates into voids thereof to thereby reduce the difference in refractive index between the surface of the crystallized fine particles 3 and the voids and diminish the scattering reflection of light, resulting also in a decrease in lightness (whiteness).

The dense film described above is suitable for the prevention of the lightness decrease described above.

Incidentally, a colored powder having a coating layer of inorganic pigment particles on the surface thereof is described in Unexamined Published Japanese Patent Application No. 4-269804. However, this colored powder is one in which voids among the pigment particles are filled up by a mixture of a surface-treating agent and a resin, and is not one in which scattering reflection occurs as in the white powder of the invention. This powder has been colored in a desired tint by the color of the pigment particles themselves. Furthermore, in this colored powder described in Unexamined Published Japanese Patent Application No. 4-269804, there are cases where the pigment particles are not sufficiently fixed to the surface of the base particles. In such cases, the colored powder may be inapplicable to coating compositions or the like because the pigment particles adherent to the base can separate therefrom in a liquid mixture of a solvent and a resin.

The white powder of the invention and processes for producing the same will be explained below in detail.

White colors in the invention are defined by the L*,a*,b* standard color system. In the white powder of the invention, the lightness L* is 55 or higher, preferably 60 or higher, more preferably 70 or higher, and even more preferably 75 or higher and 105 or lower; the absolute value of a* is preferably 10 or smaller, more preferably 7 or smaller, and even more preferably 0 or larger and 3 or smaller; and the absolute value of b* is preferably 10 or smaller, more preferably 7 or smaller, and even more preferably 0 or larger and 3 or smaller. Even in the case where the white powder of the invention is used to obtain a final product such as a color toner or color ink through coloring with a colorant such as a pigment or dye, a desired color can be reproduced while inhibiting the color from becoming dull.

The L*,a*,b* standard color system is the color space which was approved and adopted, together with the L*,u*, v* standard color system, in the 18th general meeting of the International Commission on Illumination CIE (COMMISSION INTERNATIONAL DE L'ÉCLAIRAGE) held in September, 1975 in London and was recommended in 1996, and which has visually almost equal rates. It is called CIE 1976 (L*a*b*) color space and is abbreviated as CIELAB. With respect to detailed methods of measurement and methods of color specification, measurement and color specification are made in accordance with JIS-Z-8722 (1982) "Method for Measuring Color of Object" and JIS-Z-8729 (1980) "Method for Color Specification".

The film constituted of crystallized fine particles which is possessed by the white powder of the invention may be made of any material which can scatteringly reflect light and have a white color. However, it is preferably made of a substance having a high refractive index.

The term high refractive index herein means a refractive index of 1.8 or higher, preferably 2.0 or higher, more preferably 2.2 or higher. Although the upper limit thereof is not particularly limited, it is preferably 2.7.

The substance having a high refractive index is not particularly limited, and an oxide can be used, such as titanium oxide (titania), zirconium oxide, bismuth oxide, cerium oxide, antimony oxide, or indium oxide. Most preferred is titanium oxide (titania), which has a high refractive index and is for general purposes.

For forming the above-described film constituted of crystallized fine particles, use is made of, for example, a method in which a film is formed by solid-phase deposition in a liquid phase for film-forming reaction.

Examples thereof include the method of solid-phase deposition by the hydrolysis of a metal alkoxide in an organic solvent (metal alkoxide method) as described in Unexamined Published Japanese Patent Applications Nos. 6-228604 and 7-90310 and International Publication WO 96/28269, the method of solid-phase deposition by the reaction of a metal salt in an aqueous solution (aqueous method) as described in Unexamined Published Japanese patent Application No. 11-131102, etc.

In this case, the concentration of the reaction mixture, the amount of a catalyst to be added, and the amount of base particles to be dispersed are regulated so that the rate of deposition of solid-phase fine particles in the film-forming reaction mixture is higher than the rate of growth of a deposit film (human growth rate) on the surface of the base particles in the reaction mixture.

The solid-phase fine particles deposited in a film-forming reaction mixture are adhered to the surface of the base particles in the manner described above to thereby form a coating film constituted of solid-phase fine particles.

At this point of time, the solid-phase fine particles incorporated in the film are amorphous and voids have not been formed among the solid-phase fine particles. The film hence causes no scattering reflection of light and has exceedingly low mechanical strength. Because of this, the coating film constituted of solid-phase fine particles is burned. Through this burning, the amorphous solid-phase fine particles crystallize and voids are formed among the crystallized fine particles. Thus, the above-described film which is constituted of crystallized fine particles and scatteringly reflects light is formed. The voids may have any size smaller than the particles. Preferably, the size thereof is from 0.1 to 100 nm.

For forming the film constituted of crystallized fine particles, the aqueous method is preferred to the metal alkoxide method described above because a satisfactory relationship can be easily established between linear growth rate and solid-phase deposition rate with the former method.

Furthermore, the metal alkoxide method necessitates use of an expensive metal alkoxide as a starting material and a relatively expensive and dangerous organic solvent as a reaction solvent. Because of this, the production apparatus or equipment and the like should be of the explosion proof type, resulting in impaired cost performance. From this standpoint also, the aqueous method is preferred to the metal alkoxide method.

The burning may be conducted after the formation of the above-described coating film constituted of solid-phase fine particles. However, from the standpoint of the film strength of the white powder to be obtained, bring in desirably conducted after that coating film is coated with either particles of 50 nm or smaller or an amorphous gel which each is capable of forming a dense film for filling up the voids present in the surface of the film constituted of crystallized fine particles which is to be formed from that coating film.

The burning is preferably conducted at from 300 to 1,200° C. for from 1 minute to 8 hours, preferably from 5 minutes to 3 hours.

In addition to the method in which ultrafine particles scatteringly reflecting light are formed in a liquid by regulating the rate of solid-phase deposition, existing particles also can be utilized.

Specifically, base particles and crystallized ultrafine particles of silica, titania, or the like are sufficiently evenly dispersed into a buffer solution. Thereafter, a liquid containing dissolved therein a material for depositing a film of silica, titania, or the like on the surface is dropped into the dispersion while optimizing the rate of solid-phase deposition so as to just form a film alone. As a result, solid-phase films deposited respectively on the base particles and the crystallized ultrafine particles during stirring are bonded to each other to thereby coat the base particles with the crystallized ultrafine particles.

The ultrafine particles used here are preferably ones which hardly cause Rayleigh scattering. The material of the ultrafine particles is selected from the same materials for the crystallized fine particles described above. The ultrafine particles and the crystallized fine particles may be the same or different. The particle diameter of the ultrafine particles is preferably from 0.1 to 50 nm, more preferably from 0.1 to 30 nm.

The powder on which a film has been thus formed is heated at from 300 to 1,200° C. to thereby form particles in which spaces among the crystallized ultrafine particles are filled with a film (particles having a fine-particle film). Thus, fine particles which scatter visible light are obtained. The ultrafine particles scattering visible light preferably have a high refractive index and such a particle diameter that the scattering power is maximum. The range of the particle diameter thereof is the same as that of the crystallized fine particles described above. In particular, in the case of titania, silica, and zirconia, the particle diameter is preferably from 10 to 500 nm, more preferably from 50 to 250 nm. In the case where the base particles have a lower refractive index than the crystallized ultrafine particles, the fine-particle film described above may be formed after a film having a high refractive index is directly formed on the base particles or after film formation is conducted so that a high-refractive-index film is the outermost layer.

Conversely, in the case where the base particles have a higher refractive index than the crystallized ultrafine particles, the fine-particle film is formed as a film having a low refractive index. In this case also, it is preferred to form a low-refractive-index film as the outermost layer on the base particles from the standpoint of utilizing scattering to the highest degree.

The white powder of the invention may consist of base particles and, formed thereon, only one layer of the above-described film constituted of crystallized fine particles. Alternatively, it may be a multilayer-coated powder, i.e., it may further has a film of another constitution capable of transmitting light.

The white powder may have two or more layers of the above-described film constituted of crystallized fine particles. In this case, a light-transmitting coating film having a low refractive index is preferably present between two layers of the film constituted of crystallized fine particles. The light-transmitting coating film having a low refractive index in not particularly limited, and examples thereof include ones made of a metal compound, an organic material, etc.

Furthermore, in the case of forming a crystallized-particle film, a film having a lower refractive index than the crystallized particles is formed as the first layer on the base particle side in order to improve the scattering effect of the crystallized fine particles. This film preferably has such a thickness that a scattering volume in which the crystallized particles can scatter light can be utilized. Thus, scattering by the crystallized particles can be utilized in the highest degree.

Examples of the metal compound mentioned above include metal oxides, metal sulfides, metal selenides, metal tellurides, and metal fluorides. Specific metal compounds which can be advantageously used are zinc oxide, aluminum oxide, cadmium oxide, titanium oxide, zirconium oxide, tantalum oxide, silicon oxide, antimony oxide, neodymium oxide, lanthanum oxide, bismuth oxide, cerium oxide, tin oxide, magnesium oxide, lithium oxide, lead oxide, cadmium sulfide, zinc sulfide, antimony sulfide, cadmium selenide, cadmium telluride, calcium fluoride, sodium fluoride, trisodium aluminum fluoride, lithium fluoride, magnesium fluoride, and the like.

Methods for forming the metal compound film will be explained below.

For forming the film, a vapor-phase deposition method such as the PVD method, CVD method, or spray-drying method can be used to directly form the film on base particles by vapor deposition.

However, the metal alkoxide method described in Unexamined Published Japanese Patent Application No. 6-228604 or 7-90310 or International Publication WO 96/28269, each cited above, and the aqueous method described in Unexamined Published Japanese Patent Application No. 11-131102 are preferred.

In this case, reaction conditions are regulated so as to keep the rate of linear growth higher than the rate of solid-phase deposition and thereby for an amorphous even film, unlike the conditions for the formation of the above-described film constituted of crystallized fine particles.

Although the organic material mentioned above is not particularly limited, it is preferably a resin. Examples of the resin include cellulose, cellulose acetate, polyamides, epoxy resins, polyesters, melamine resins, polyurethanes, vinyl acetate resins, silicon resins, polymers or copolymers of acrylic esters, methacrylic esters, styrene, ethylene, propylene, and derivatives of these, and the like.

In the case of forming an organic material film (resin film), use may be made of (a) a method in which base particles are dispersed in a liquid phase and a resin film is formed on the particles by emulsion polymerization (liquid-phase polymerization method), (b) a method in which the film is formed in a vapor phase (CVD) (PVD), etc.

In the case where the white powder of the invention is one comprising base particles having a multilayered film formed thereon, an example of the production thereof is shown below.

For example, when the base particles, which will be described later in detail, are ones made of a substance having a high refractive index, then a light-transmitting film having a low refractive index is formed thereon and a film constituted of particles and having a high refractive index and a light-transmitting film having a low refractive index are successively formed thereon. When the base particles are ones having a low refractive index, then a film constituted of particles and having a high refractive index, a light-transmitting film having a low refractive index, and a film constituted of particles and having a high refractive index are successively formed thereon.

The base particles used in the white powder are not particularly limited. They may be made of an inorganic material containing a metal or an organic material, or may be a magnetic material, dielectric, electrically conductive material, insulating material, or the like.

In the case where the base is a metal, it may be any metal such as iron, nickel, chromium, titanium, aluminum, etc. However, when the base is one whose magnetism is to be utilized, then the base is preferably one which becomes magnetic, e.g., iron. These metals may be alloys. When the base having magnetism is used, it is preferably a ferromagnetic alloy.

In the case where the base of the powder is a metal compound, typical examples thereof include the aforementioned metal oxides. For example, oxides of calcium, magnesium, barium, and the like may be used besides oxides of iron, nickel, chromium, titanium, aluminum, silicon, and the like. Alternatively, composite oxides of these may be used. Furthermore, examples of the metal compound other than metal oxides include metal nitrides, metal carbides, metal sulfides, metal fluorides, metal carbonates, metal phosphates, and the like.

Furthermore, a compound of a metalloid or nonmetal, besides metal compounds, can be used as base particles. In particular, an oxide, carbide, or nitride of a metalloid or nonmetal, e.g., silica or glass beads, can be used.

Other usable inorganic materials include inorganic hollow particles such as shirasu balloons (hollow silicic acid particles), hollow carbon microspheres (Kurecasphere), fused alumina bubbles, Aerosil, white carbon, hollow silica microspheres, hollow calcium carbonate microspheres, calcium carbonate, perlite, talc, bentonite, micas such as synthetic mica and commonmica, kaolin, and the like.

Preferred organic materials are resin particles. Examples of the resin particles include cellulose powders, cellulose acetate powders, polyamides, epoxy resins, polyesters, melamine resins, polyurethanes, vinyl acetate resins, silicon resins, spherical or pulverized particles obtained by the polymerization or copolymerization of acrylic esters, methacrylic esters, styrene, ethylene, propylene, and derivatives of these, and the like. Especially preferred resin particles are spherical acrylic resin particles obtained by the polymerization of acrylic acid or a methacrylic ester.

It should, however, be noted that in the case of using resin particles as a base, the heating temperature in drying should be not higher than the melting point of the resin.

Examples of the shape of the base include isotropic bodies such as sphere, nearly spherical shapes, and regular polyhedrons and polyhedrons such as rectangular parallelopipeds, spheroids, rhombohedrons, platy bodies, and acicular bodies (cylinders and prisms). Also usable is a powder having completely irregular particle shapes, such as one formed by pulverization.

Although these bases are not particularly limited in particle diameter, preferred bases have a particle diameter in the range of from 0.01 $\mu$m to several millimeters.

Furthermore, the base particles to be used have a specific gravity in the range of from 0.1 to 10.5. However, in the case where the powder obtained is to be used as a dispersion in a liquid, etc., the specific gravity thereof is preferably from 0.1 to 5.5, more preferably from 0.1 to 2.8, even more preferably from 0.5 to 1.8, from the standpoints of flowability and suspensibility. If the specific gravity of the base is smaller than 0.1, the base has too high buoyancy in liquids. Consequently, when the powder to be obtained from this base in intended to be used as a dispersion in a liquid, etc., a film which is composed of a large number of layers or is exceedingly thick should be formed. This is uneconomical. On the other hand, if the specific gravity thereof exceeds 10.5, a thick film is necessary for suspending the particles and this also is uneconomical.

The invention will be explained below in more detail by reference to Examples, but the scope of the invention should not, of course, be construed as being limited by these.

EXAMPLE 1

Whitening of Magnetite Powder Particles: Two-layer Coating from Aqueous System:
Formation of Silica Film As First Layer
(1) Preparation of Buffer Solutions
In 1 L of water were dissolved 0.4 M potassium chloride reagent and 0.4 M boric acid to prepare buffer in solution 1.
In 1 L of water was dissolved 0.4 M sodium hydroxide to prepare buffer solution 2.
250 mL of the buffer solution 1 was mixed with 115 mL of the buffer solution 2, and the mixture was homogenized to prepare buffer solution 3.
(2) Aqueous Sodium Silicate Solution (Water Glass Solution)
Sodium silicate reagent was diluted with pure water to regulate the concentration so as to result in an $SiO_2$ content of 10 wt %.
(3) Silica Film Formation
To 365 mL of buffer solution 3 (pH: about 9.0) prepared beforehand was added 15 g of a magnetite powder (average particle diameter, 2.3 $\mu$m) as base particles to obtain a dispersion. The vessel containing this dispersion was placed in the water-filled tank of an ultrasonic washer (Type US-6, manufactured by IUCHI SEIEIDO CO., LTD.). The magnetite powder was further dispersed with stirring in the buffer solution 3 while applying ultrasonic thereto in the ultrasonic bath of 28 kHz and 200 W. Thereto was added 20 mL of the aqueous sodium silicate solution also prepared beforehand at a rate of 40 mL/min to gradually react and decompose the silicate. Thus, a silica film was deposited on the surface.

After completion of the addition of the aqueous sodium silicate solution, the mixture was reacted for further 2 hours to react all the unreacted starting material. After completion of the film-forming reaction, the slurry containing the powder on which a silica film had been formed was repeatedly decanted using sufficient water to wash the powder.

After the washing, the powder on which a silica film had been formed was placed in a vat, and the powder was allowed to sediment and separate. The supernatant was discarded, and the residue was dried in air with a drying oven at 150° C. for 8 hours to obtain a silica-coated magnetite powder $A_1$.

Formation of Titania Film As Second Layer
(1) Preparation of Buffer Solution

In 1 L of deionized water were dissolved 0.3 M acetic acid and 0.9 M sodium acetate to obtain buffer solution 4.

(2) Aqueous Titanium Sulfate Solution

Titanium sulfate was added to water and the solution was diluted so as to regulate the concentration to 0.6 M/L. Thus, an aqueous titanium sulfate solution was obtained.

(3) Titania Film Formation 250 mL of buffer solution 4 (pH: about 4.1) was prepared for 5.5 g of the powder $A_1$. The powder $A_1$ was sufficiently dispersed into the buffer solution 4 while applying ultrasonic thereto in an ultrasonic bath in the same manner as in the silica film formation described above. Thereafter, while the temperature of the liquid was kept at 50 to 55° C., the aqueous titanium sulfate solution prepared beforehand was added dropwise thereto at a rate of 1.9 mL/min to precipitate solid-phase fine particles in the liquid and thereby make the liquid slightly milk-white. Thereafter, the rate of dropwise addition was lowered to 1.5 mL/min to gradually precipitate the unreacted ingredient in order to fix the solid-phase fine particles to the surface of the powder $A_1$. As a result, the solid-phase fine particles which had precipitated in the liquid were fixed to the surface of the base particles and, in addition, the surface thereof was coated with ultrafine particles having a smaller particle diameter than the solid-phase fine particles fixed to the base particle surface.

(4) Washing and Drying

After completion of the film-forming reaction, decantation was repeated using pure water to remove the unreacted reactant, excess sulfuric acid, and sulfuric acid formed by the reaction. Solid/liquid separation was conducted, and the solid was dried with a vacuum dryer to obtain a dry powder.

The dry powder obtained was heat-treated (burned) in a rotary tubular oven at 500° C. for 30 minutes to obtain a silica/titania-coated magnetite powder $A_2$ having a smooth surface.

This two-layer-coated powder $A_2$ was yellowish white and had a magnetization of 40 emu/g at 10 kOe. This two-layer-coated powder $A_2$ had a maximum reflection peak at 630 nm. Values of this two-layer-coated powder $A_2$ in the L*,a*,b* standard color system are shown in Table 1.

EXAMPLE 2

Whitening of Magnetite Powder Particles; Three-layer Coating from Aqueous System Formation of Silica Film As First Layer To 365 mL of the buffer solution 3 (pH: about 9.0) prepared beforehand was added 15 g of a spherical magnetite powder (average particle diameter, 2.3 μm) as base particles to obtain a dispersion. The vessel containing this dispersion was placed in the water-filled tank of an ultrasonic washer (Type US-6, manufactured by Iuchi Seieido K.K.). The magnetite powder was further dispersed with stirring in the buffer solution 3 while applying ultrasonic thereto in the ultrasonic bath of 26 kHz and 600 W. Thereto was added 23 mL of the aqueous sodium silicate solution also prepared beforehand at a rate of 40 mL/min to gradually react and decompose the silicate. Thus, a silica film was deposited on the surface.

After completion of the addition of the aqueous sodium silicate solution, the mixture was reacted for further 2 hours to react all the unreacted starting material. After completion of the film-forming reaction, the slurry containing the powder on which a silica film had been formed was repeatedly decanted using sufficient water to wash the powder. After the washing, the powder on which a silica film had been formed was placed in a vat, and the powder was allowed to sediment and separate. The supernatant was discarded, and the residue was dried in air with a drying oven at 150° C. for 8 hours and then heat-treated (burned) in a nitrogen atmosphere at 300° C. for 30 minutes to obtain a silica-coated magnetite powder $B_1$.

Formation of Titania Film As Second Layer

Buffer solution 4 and an aqueous titanium sulfate solution were prepared in the same manner as in Example 1.

250 mL of the buffer solution 4 (pH: about 4.1) was prepared for 5.5 g of the powder $B_1$. The powder $B_1$ was sufficiently dispersed into the buffer solution 4 while applying ultrasonic thereto in an ultrasonic bath in the save manner as in the silica film formation described above. Thereafter, while the temperature of the liquid was kept at 50 to 55° C., the aqueous titanium sulfate solution prepared beforehand was gradually added dropwise thereto at a constant rate of 1.9 mL/min.

In an initial stage of the dropwise addition, solid-phase fine particles precipitated in the liquid. However, the solid-phase fine particles were fixed to the surface of the base particles and, in addition, the surface thereof was coated with ultrafine particles having a smaller particle diameter than the solid-phase fine particles fixed to the base particle surface. Thus, a silica/titania-coated magnetite powder $B_2$ was obtained.

This two-layer-coated powder $B_2$ was yellowish white and had a maximum reflection peak at 630 nm, like the powder $A_2$ obtained in Example 1.

The surface of this powder $B_2$ had slight roughness and partly had protrusions attributable to titania particles.

Formation of Silica Film As Third Layer; Case where the Titania Film Surface was Covered with Thin Silica Film Buffer solutions 1 and 2 and an aqueous sodium silicate solution (water glass solution) were prepared in the same manner as in Example 1.

The powder described above, i.e., the silica/titania-coated magnetite powder $B_2$, was subjected to silica film formation thereon. In the film formation, the buffer solution amount was the same as in the first layer coating described above but the aqueous sodium silicate solution was dropwise added at the same rate in an amount changed to 8 mL. The reaction mixture was reacted for 2 hours until the mixture came to contain no unreacted reactant. The particles were washed in the same manner as described above. After the washing, the powder was heat-treated (burned) in a rotary tubular oven in a nitrogen atmosphere at 600° C. for 30 minutes to obtain a silica/titania-coated magnetite powder $B_3$.

The powder $B_3$ obtained had two silica films with a smooth surface and crystallized fine titania particles interposed between the two layers, and was a white powder showing enhanced light scattering. The surface of $B_3$ had no recesses or protrusions, was almost smooth, and was free from holes, cracks, recesses, etc. Values in the L*,a*,b* standard color system are shown in Table 1.

In an examination with a transmission electron microscope, crystallization of the fine titania particles interposed between the two silica layers was observed and voids were found to be present among the particles. It was hence thought that scattering reflection was enhanced at the interface between the particles and the voids.

EXAMPLE 3

Case where Scattering Particles were Adhered to Surface; Four-layer Coating from Aqueous System Formation of Silica Film As First Layer To 580 g of buffer solution 3 (pH: about 9.0) prepared beforehand was added 20 g of a magnetite powder (average particle diameter, 0.7 μm) as base particles to obtain a dispersion. In the same manner as in Example 1, the magnetite powder was further dispersed with stirring in the buffer solution 3 while applying ultrasonic thereto in an ultrasonic bath of 28 kHz and 600 W. Thereto was gradually added 160 mL of the aqueous sodium silicate solution also prepared beforehand at a rate of 2.67 mL/min to deposit a silica film on the surface.

After completion of the addition of the aqueous sodium silicate solution, the mixture was reacted for further 2 hours to react all the unreacted starting material.

After completion of the film-forming reaction, the slurry containing the powder on which a silica film had been formed was repeatedly decanted using sufficient water to wash the powder.

After the washing, the powder on which a silica film had been formed was placed in a vat, and the powder was allowed to sediment and separate. The supernatant was discarded, and the residue was dried in air with a drying oven at 150° C. for 9 hours to obtain a silica-coated magnetite powder $C_1$.

Formation of Titania Film As Second Layer 400 mL of pure water was prepared for 15 g of the powder $C_1$. The powder $C_1$ was sufficiently dispersed into the pure water while applying ultrasonic thereto in an ultrasonic bath in the same manner as in the silica film formation described above. Thereafter, while the temperature of the liquid was kept at 50 to 55° C., 405 mL of au aqueous titanyl sulfate solution (TiO$_2$, 15 wt %) prepared beforehand was gradually added dropwise thereto at a constant rate of 1.25 mL/min. At the time when the dropwise addition ended, the liquid was slightly milk-white.

After completion of the dropwise addition, the mixture was reacted for further 3 hours to gradually precipitate the unreacted ingredient and incorporate the particles into the film.

After completion of the film-forming reaction, decantation was repeated using sufficient pure water to remove the unreacted reactant, excess sulfuric acid, and sulfuric acid formed by the reaction. Solid/liquid separation was conducted, and the solid was dried with a vacuum dryer to obtain a dry powder.

The dry powder obtained was heat-treated (burned) in a rotary tubular oven at 500° C. for 30 minutes to obtain a silica/titania-coated magnetite powder $C_2$.

This two-layer-coated powder $C_2$ was yellowish green-white and had a maximum reflection peak at 580 nm with a reflectance of 32%. Values of this two-layer-coated powder $C_2$ in the L*,a*,b* standard color system are shown in Table 1.

Formation of Silica Film As Third Layer

To 580 g of buffer solution 3 (pH: about 9) prepared beforehand was added 15 g of the silica/titania-coated magnetite powder $C_2$. In the same manner as for the first layer, the magnetite powder was further dispersed with stirring in the buffer solution 3 while applying ultrasonic thereto in an ultrasonic bath of 28 kHz and 600 W. Thereto was gradually added 220 mL of the aqueous sodium silicate solution also prepared beforehand at a rate of 2.67 mL/min to deposit a silica film on the surface.

After completion of the addition of the aqueous sodium silicate solution, the mixture was reacted for further 2 hours to react all the unreacted starting material.

After completion of the film-forming reaction, the slurry containing the powder on which a silica film had been formed was repeatedly decanted using sufficient water to wash the powder.

After the washing, the powder on which a silica film had been formed was placed in a vat, and the powder was allowed to sediment and separate. The supernatant was discarded, and the residue was dried in air with a drying oven at 150° C. for hours to obtain a silica/titania-coated magnetite powder $C_3$.

Formation of Titania Film As Fourth Layer 400 mL of pure water was prepared for 12 g of the powder $C_3$. The powder $C_3$ was sufficiently dispersed into the pure water while applying ultrasonic thereto in an ultrasonic bath in the same manner as in the silica film formation described above. Thereafter, while the temperature of the liquid was kept at 50 to 55° C., 405 mL of an aqueous titanyl sulfate solution (TiO$_2$, 15 wt %) prepared beforehand was gradually added dropwise thereto at a constant rate of 1.25 mL/min to precipitate solid-phase fine particles. At the time when the dropwise addition ended, the liquid was slightly milk-white. After completion of the dropwise addition, the mixture was reacted for further 3 hours to gradually precipitate the unreacted ingredient as solid-phase fine particles and incorporate the fine particles into the film.

After completion of the film-forming reaction, decantation was repeated using sufficient pure water to remove the unreacted reactant, excess sulfuric acid, and sulfuric acid formed by the reaction. Solid/liquid separation was conducted, and the solid was dried with a vacuum dryer to obtain a dry powder.

The dry powder obtained was heat-treated (burned) in a rotary tubular oven at 500° C. for 30 minutes to obtain a silica/titania-coated magnetite powder $C_4$.

This four-layer-coated powder $C_4$ was yellowish white and had a maximum reflection peak at 620 nm with a reflectance of 53%. Values of this four-layer-coated powder $C_4$ in the L*,a*,b* standard color system are shown in Table 1.

EXAMPLE 4

Whitening of Iron Metal Powder; Three-layer Coating by Hydrolysis of Metal Alkoxide Formation of Silica Film As First Layer Twenty grams of a carbonyl iron powder (average particle diameter, 1.8 μm; magnetization at 10 kOe, 203 emu/g) manufactured by BASF was dispersed into a solution prepared beforehand by dissolving 3.5 g of silicon ethoxide in 158.6 g of ethanol. Thereto was then added, with stirring, a solution prepared beforehand by mixing 8.0 g of ammonia water (29%) with 8.0 g of deionized water. After the addition, the reaction mixture was reacted for 5 hours at ordinary temperature. After the reaction, the reaction mixture was diluted and washed with sufficient ethanol and filtered. The particles recovered were dried in a vacuum dryer at 110° C. for 3 hours. After the drying, the particles were heat-treated (burned) with a rotary tubular oven in a nitrogen atmosphere at 800° C. for 30 minutes and then cooled to obtain a silica-coated iron powder $D_1$.

Formation of Titania Film As Second Layer

In a separable flask, 20 g of the silica-coated powder $D_1$ was dispersed into a liquid prepared beforehand by adding 4.6 g of titanium isopropoxide to 198.3 g of ethanol. Thereafter, a solution prepared beforehand by mixing 6.0 g of pure water with 47.9 g of ethanol was added dropwise to the dispersion with stirring over 1 hour. After the dropwise addition, the reaction mixture was reacted for 5 hours at ordinary temperature. After the reaction, the reaction mixture was diluted and washed with sufficient ethanol and filtered. The particles recovered were dried in a vacuum dryer at 110° C. for 3 hours to obtain a silica/titania-coated iron powder $D_2$.

The titania layer dried was examined with a transmission electron microscope for the state of particles in the layer. As a result, solid-phase fine titanium oxide particles of from 1 to 10 nm were observed. However, there were no voids among the particles in the film, and the particles were evenly packed.

This titanium oxide film had an average thickness of 155 nm, gave a spectral reflection curve having a peak wavelength of 600 nm, was yellowish green-white, and had a reflectance of 45% at the peak wavelength.

Formation of Silica Film As Third Layer

Twenty grams of the silica/titania-coated iron powder $D_2$ was dispersed into a solution prepared beforehand by dissolving 0.5 g of silicon ethoxide in 158.6 g of ethanol. Thereto was then added, with stirring, a solution prepared beforehand by mixing 3.0 g of ammonia water (29%) with 3.0 g of deionized water. After the addition, the reaction mixture was reacted for 1 hour at ordinary temperature. After the reaction, the reaction mixture was diluted and washed with sufficient ethanol and filtered. The particles recovered were dried in a vacuum dryer at 110° C. for 3 hours. After the drying, the particles were further heat-treated (burned) in a nitrogen atmosphere at 650° C. for 30 minutes and then cooled to obtain a silica/titania-coated iron powder $D_3$.

The titania layer after the heat treatment was examined with a transmission electron microscope for the state of particles in the layer. As a result, crystallized fine titanium oxide particles of from 10 to 150 nm were observed and voids of about from 10 to 50 nm were observed among the particles.

However, the silica layers were dense, contained no particles, and were smooth. Furthermore, voids were present at the interfaces with the titania.

This powder $D_3$ had a maximum reflection peak wavelength of 550 nm and was a greenish white powder having a reflectance of 55%.

This Example 4 shows that the heat treatment (burning) caused the conversion of titania particles into crystallized particles and the resultant formation of voids among the particles and at the interfaces with the silica films. It is thought that whitening was accomplished due to the scattering reflection effect attributable to the particle formation.

Furthermore, one of the features of the white powder of this Example 4 resides in that a dense film is formed as the final coating layer. Unlike conventional final layers, the final coating layer in this Example is not limited to a high-refractive-index film. A dense film which exerts no influences on interference or scattering is formed to cover voids. When a powder obtained by a conventional technique is used as a pigment for toners, coating compositions, and the like, there have been cases where a resin or vehicle infiltrates into voids to reduce the difference in refractive index between the interfering or scattering particles and the voids, resulting in a reduced Fresnel reflectance. However, by forming a dense film exerting no influences on interference or scattering as a final layer to cover the voids of a film constituted of particles, that decrease in scattering reflection can be prevented.

EXAMPLE 5

Whitening of Iron Metal Powder; Five-layer Coating by Hydrolysis of Metal Alkoxide Formation of Silica Film As First Layer Twenty grams of a carbonyl iron powder (average particle diameter, 1.8 μm; magnetization at 10 kOe, 203 emu/g) manufactured by BASF was dispersed into a solution prepared beforehand by dissolving 4.4 g of silicon ethoxide in 158.6 g of ethanol. Thereto was then added, with stirring, a solution prepared beforehand by mixing 8.0 g of ammonia water (29%) with 8.0 g of deionized water. After the addition, the reaction mixture was reacted for 5 hours at ordinary temperature. After the reaction, the reaction mixture was diluted and washed with sufficient ethanol and filtered. The particles recovered were dried in a vacuum dryer at 110° C. for 3 hours. After the drying, the particles were heat-treated (burned) with a rotary tubular oven in a nitrogen atmosphere at 600° C. for 30 minutes and then cooled to obtain a silica-coated iron powder $E_1$.

Formation of Titania Film As Second Layer

In a separable flask, 20 g of the silica-coated powder $E_1$ was dispersed into a liquid prepared beforehand by adding 8.1 g of titanium isopropoxide to 198.3 g of ethanol. Thereafter, a solution prepared beforehand by mixing 6.3 g of pure water with 47.9 g of ethanol was added dropwise to the dispersion with stirring over 1 hour. After the dropwise addition, the reaction mixture was reacted for 3 hours at ordinary temperature. After the reaction, the reaction mixture was diluted and washed with sufficient ethanol and filtered. The particles recovered were dried in a vacuum dryer at 100° C. for 8 hours to obtain a silica/titania-coated iron powder $E_2$.

This titanium oxide film had an average thickness of 170 nm, gave a spectral reflection curve having a peak wavelength of 667 nm, had a white color with a yellowish green tint, and had a reflectance of 48% at the peak wavelength.

Formation of Silica Film As Third Layer

Twenty grams of the silica/titania-coated iron powder $E_2$ was dispersed into a solution prepared beforehand by dissolving 3.7 g of silicon ethoxide in 158.6 g of ethanol. Thereto was then added, with stirring, a solution prepared beforehand by mixing 8.0 g of ammonia water (29%) with 8.0 g of deionized water. After the addition, the reaction mixture was reacted for 5 hours at ordinary temperature. After the reaction, the reaction mixture was diluted and washed with sufficient ethanol and filtered. The particles recovered were dried in a vacuum dryer at 110° C. for 3 hours. After the drying, the particles were further heat-treated (burned) with a rotary tubular oven in a nitrogen atmosphere at 600° C. for 30 minutes and then cooled to obtain a silica/titania-coated iron powder $E_3$.

Formation of Titania Film As Fourth Layer

In a separable flask, 20 g of the silica-coated powder $E_3$ was dispersed into a liquid prepared beforehand by adding 8.8 g of titanium isopropoxide to 198.3 g of ethanol. Thereafter, a solution prepared beforehand by mixing 6.0 g of pure water with 47.9 g of ethanol was added dropwise to the dispersion with stirring over 1 hour. After the dropwise addition, the reaction mixture was reacted for 4 hours at ordinary temperature. After the reaction, the reaction mixture was diluted and washed with sufficient ethanol and filtered. The particles recovered were dried in a vacuum dryer at 100° C. for 8 hours to obtain a silica/titania-coated iron powder $E_4$.

Formation of Silica Film As Fifth Layer

Twenty grams of the silica/titania-coated iron powder $E_4$ was dispersed into a solution prepared beforehand by dissolving 2.5 g of silicon ethoxide in 158.6 g of ethanol. Thereto was then added, with stirring, a solution prepared beforehand by mixing 3.0 g of ammonia water (29%) with 3.0 g of deionized water. After the addition, the reaction mixture was reacted for 5 hours at ordinary temperature. After the reaction, the reaction mixture was diluted and washed with sufficient ethanol and filtered. The particles recovered were dried in a vacuum dryer at 110° C. for 3 hours. After the drying, the particles were further heat-treated (burned) with a rotary tubular oven in a nitrogen atmosphere at 600° C. for 30 minutes and then cooled to obtain a silica/titania-coated on powder $E_5$.

This titanium oxide film had an average thickness of 152 nm. Furthermore, this iron powder $E_5$ gave a spectral reflection curve having a peak wavelength of 580 nm, was yellowish green-white, and had a maximum reflectance of 88% at the peak wavelength.

The results given above show that with respect to the void-possessing titania coating layer formed through the conversion of titania particles into crystallized particles, the coated powder having two such layers (second layer and fourth layer) attained a higher degree of whiteness than the coated powder having one such layer (second layer).

EXAMPLE 6

Whitening of Magnetite Powder Particle; Two-layer Coating from Aqueous System; Use of Existing Titania Particles Formation of Silica Film As First Layer Ten grams of a magnetite powder (average particle diameter, 0.7 µm) as base particles was added to 540 mL of the buffer solution 3 prepared beforehand, and sufficiently dispersed therein. The vessel containing this suspension was placed in the water tank of an ultrasonic washer (Type US-6, manufactured by Iuchi Seieido K.K.) of 600 W and 28 kHz, and the suspension was stirred at 550 rpm. Simultaneously with initiation of the stirring, ultrasonic irradiation was initiated.

Subsequently, a given amount, 90 g of a 10 wt % aqueous solution of sodium silicate was added dropwise at a rate of 1.34 mL/min to that suspension which was kept being stirred. After completion of the dropwise addition, stirring was continued for further 1 hour to form a silica film on the surface of the raw magnetite.

After the lapse of the given time period, the slurry containing the powder on which a silica film had been formed was repeatedly decanted using sufficient ion-exchanged water to wash the powder. After the washing operation, the slurry containing the powder on which a silica film had been formed was dried at 110° C. for 8 hours to obtain a silica-coated magnetite powder $F_1$.

Formation of Titania Film As Second Layer (1) Preparation of Aqueous Titanium Sulfate Solution A titanyl sulfate stock solution having a $TiO_2$ concentration of 2.04 M was diluted with ion-exchanged water so as to result in a $TiO_2$ concentration of 0.14 M to prepare an aqueous titanium sulfate solution.

(2) Titania Film Formation

In 400 mL of ion-exchanged water was suspended 4 g of a raw powder obtained by sufficiently mixing the powder $F_1$ with titania particles (CR-50, manufactured by Ishihara Sangyo Kaisha, Ltd.; average particle diameter, 250 nm) in a weight ratio of 1:1. The vessel containing this suspension was immersed in a thermostatic water bath kept at 50° C., and the suspension was stirred at 600 rpm.

At the time when the temperature of the suspension had reached 50° C., a given amount, 149 g (144 mL), of the aqueous titanium sulfate solution was added dropwise thereto at a rate of 0.5 mL/min. After completion of the dropwise addition, stirring was continued for further 90 minutes to form a titania film on the powder $F_1$.

After the lapse of the given time period, the slurry containing the powder on which a titania film had been formed was repeatedly decanted using sufficient ion-exchanged water to wash the powder. After completion of the washing operation, the slurry containing the powder on which a titania film had been formed was dried at 110° C. for 8 hours to obtain a silica/titania-coated magnetite powder $F_2$.

The powder $F_2$ obtained consisted of the powder $F_1$ which had a titania film formed thereon and simultaneously had, densely adherent to the surface thereof, the titania particles contained in the raw powder. Since light scattering hence occurred sufficiently, the powder $F_2$ was white-gray. It had a maximum reflectance of 33% at 420 nm. In the $L^*,a^*,b^*$ standard color system, $L^*=88.2$, $a^*=-0.4$, and $b^*=-4.5$ as shown in Table 1.

Furthermore, the surface of the titania-coated magnetite powder $F_2$ obtained was examined with a scanning electron microscope. As a result, it was found that titania particles were densely adherent to the surface of the base particles and that finer titania particles precipitated from the aqueous titanium sulfate solution were adherent in voids among those titania particles.

EXAMPLE 7

Whitening of Magnetite Powder Particles; Two-layer Coating from Aqueous System; Silica Coating Film Containing Existing Titania Particles Formation of Silica Film As First Layer Fifteen grams of a particulate magnetite powder (average particle diameter, 1.0 µm) as base particles was added to 800 mL of the buffer solution 3 prepared beforehand, and sufficiently dispersed therein. The vessel containing this suspension was placed in the water tank of an ultrasonic washer (Type US-6, manufactured by Iuchi Seieido K.K.) of 200 W and 28 kHz, and the suspension was stirred. Simultaneously with initiation of the stirring, ultrasonic irradiation was initiated. Subsequently, 50 mL of 10 wt % aqueous sodium silicate solution was added dropwise thereto at a rate of 40 mL/min to gradually react and decompose the silicate. Thus, a silica film was deposited on the surface. After completion of the dropwise addition of the aqueous sodium silicate solution, the mixture was reacted for further 2 hours to react all the unreacted starting material.

After completion of the film-forming reaction, the slurry containing the powder on which a silica film had been formed was repeatedly decanted using sufficient ion-exchanged water to wash the powder.

After the washing operation, the powder on which a silica film had been formed was placed in a vat, and the powder was allowed to sediment and separate. The supernatant was discarded, and the residue was dried with a drying oven at 130° C. for 8 hours and then heat-treated in air at 500° C. for 30 minutes to obtain a silica-coated magnetite powder $G_1$.

Formation of Film Constituted of Crystallized Fine Particles (Scattering Film) As Second Layer Fourteen grams of the silica-coated magnetite powder $G_1$ and 13 g of ultrafine titanium oxide crystal particles (CR-50, manufactured by Ishihara Sangyo Kaisha, Ltd.) were added to 800 mL of the buffer solution 3, and sufficiently dispersed therein. The vessel containing this suspension was placed in the water tank of an ultrasonic washer (Type US-6, manufactured by Iuchi Seieido K.K.) of 200 W and 28 kHz, and the suspension was stirred. Simultaneously with initiation of the stirring, ultrasonic irradiation was initiated.

Subsequently, 60 mL of 10 wt % aqueous sodium silicate solution was added dropwise thereto at a rate of 40 mL/min to gradually react and decompose the silicate. Thus, a silica film was deposited on the surface. After completion of the dropwise addition of the aqueous sodium silicate solution, the mixture was reacted for further 2 hours to react all the unreacted starting material.

After completion of the film-forming reaction, the slurry containing the powder on which a silica film had been formed was repeatedly decanted using sufficient ion-exchanged water to wash the powder.

After the washing operation, the powder on which a silica film had been formed was placed in a vat, and the powder was allowed to sediment and separate. The supernatant was discarded, and the residue was dried with a drying oven at 130° C. for 8 hours and then heat-treated in air at 500° C. for 30 minutes to obtain a silica/titania-coated magnetite powder $G_2$.

The powder obtained had a magnetization of 20 emu/g at 1 kOe, and L* in the L*,a*,b* standard color system was 66.

EXAMPLE 8
Whitening of Magnetite Powder Particles; Three-layer Coating from Aqueous System: Two-layer Silica Coating Film Containing Existing Titania Particles
Formation of Silica Film As First Layer Fifteen grams of a particulate magnetite powder (average particle diameter, 1.0 μm) as base particles was added to 800 mL of the buffer solution 3 prepared beforehand, and sufficiently dispersed therein. The vessel containing this suspension was placed in the water tank of an ultrasonic washer (Type US-6, manufactured by Iuchi Seieido K.K.) of 200 W and 28 kHz, and the suspension was stirred. Simultaneously with initiation of the stirring, ultrasonic irradiation was initiated. Subsequently, 50 mL of 10 wt % aqueous sodium silicate solution was added dropwise thereto at a rate of 40 mL/min to gradually react and decompose the silicate. Thus, a silica film was deposited on the surface. After completion of the dropwise addition of the aqueous sodium silicate solution, the mixture was reacted for further 2 hours to react all the unreacted starting material.

After completion of the film-forming reaction, the slurry containing the powder on which a silica film had been formed was repeatedly decanted using sufficient ion-exchanged water to wash the powder.

After the washing operation, the powder on which a silica film had been formed was placed in a vat, and the powder was allowed to sediment and separate. The supernatant was discarded, and the residue was dried with a drying oven at 130° C. for 8 hours and then heat-treated in air at 500° C. for 30 minutes to obtain a silica-coated magnetite powder $H_1$.
Formation of Film Constituted of Crystallized Fine Particles (Scattering Film) As Second Layer Fourteen grams of the silica-coated magnetite powder $H_1$ and 7 g of ultrafine titanium oxide crystal particles (CR-50, manufactured by Ishihara Sangyo Kaisha, Ltd.) were added to 800 mL of the buffer solution 3, and sufficiently dispersed therein. The vessel containing this suspension was placed in the water tank of an ultrasonic washer (Type US-6, manufactured by Iuchi Seieido K.K.) of 200 W and 28 kHz, and the suspension was stirred. Simultaneously with initiation of the stirring, ultrasonic irradiation was initiated.

Subsequently, 30 mL of 10 wt % aqueous sodium silicate solution was added dropwise thereto at a rate of 40 mL/min to gradually react and decompose the silicate. Thus, a silica film was deposited on the surface. After completion of the dropwise addition of the aqueous sodium silicate solution, the mixture was reacted for further 2 hours to react all the unreacted starting material.

After completion of the film-forming reaction, the slurry containing the powder on which a silica film had been formed was repeatedly decanted using sufficient ion-exchanged water to wash the powder.

After the washing operation, the powder on which a silica film had been formed was placed in a vat, and the powder was allowed to sediment and separate. The supernatant was discarded, and the residue was dried with a drying oven at 130° C. for 8 hours and then heat-treated in air at 500° C. for 30 minutes to obtain a silica/titania-coated magnetite powder $H_2$.

The powder obtained had a magnetization of 30 emu/g at 1 kOe, and L* in the L*,a*,b* standard color system was 56.
Formation of Film Constituted of Crystallized Fine Particles (Scattering Film) As Third Layer The powder $H_2$ and 7 g of ultrafine titanium oxide crystal particles (CR-50) were added to 800 mL of the buffer solution 3, and sufficiently disposed therein. The vessel containing this suspension was placed in the water tank of an ultrasonic washer (Type US-6, manufactured by Iuchi Seieido K.K.) of 200 W and 28 kHz, and the suspension was stirred. Simultaneously with initiation of the stirring, ultrasonic irradiation was initiated.

Subsequently, 30 mL of 10 wt % aqueous sodium silicate solution was added dropwise thereto at a rate of 40 mL/min to gradually react and decompose the silicate. Thus, a silica film was deposited on the surface. After completion of the dropwise addition of the aqueous sodium silicate solution, the mixture was reacted for further 2 hours to react all the unreacted starting material.

After completion of the film-forming reaction, the slurry containing the powder on which a silica film had been formed was repeatedly decanted using sufficient ion-exchanged water to wash the powder.

After the washing operation, the powder on which a silica film had been formed was placed in a vat, and the powder was allowed to sediment and separate. The supernatant was discarded, and the residue was dried with a drying oven at 130° C. for 8 hours and then heat-treated in air at 500° C. for 30 minutes to obtain a silica/titania-coated magnetite powder $H_3$.

The powder obtained had a magnetization of 20 emu/g at 1 kOe, and L* in the L*,a*,b* standard color system was 77.

Comparative Example 1
Two-layer Coating of Magnetite Powder Particles from Aqueous System; without Forming Film Constituted of Crystallized Fine Particles
Formation of Silica Film As First Layer Ten grams of a magnetite powder (average particle diameter, 0.7 μm) as base particles was added to 540 mL of the buffer solution 3 prepared beforehand, and sufficiently dispersed therein. The vessel containing this suspension was placed in the water tank of an ultrasonic washer (Type US-6, manufactured by Iuchi Seieido K.K.) of 600 W and 28 kHz, and the suspension was stirred at 550 rpm. Simultaneously with initiation of the stirring, ultrasonic irradiation was initiated.

Subsequently, a given amount, 90 g, of a 10 wt % aqueous solution of sodium silicate was added dropwise at a rate of 1.34 mL/min to that suspension which was kept being stirred. After completion of the dropwise addition, stirring was continued for further 1 hour to form a silica film on the surface of the raw magnetite.

After the lapse of the given time period, the slurry containing the powder on which a silica film had been formed was repeatedly decanted using sufficient ion-exchanged water to wash the powder. After the washing operation, the slurry containing the powder on which a silica film had been formed was dried at 110° C. for 8 hours to obtain a silica-coated magnetite powder $I_1$.

Formation of Titania Film As Second Layer

In 400 mL of ion-exchanged water was suspended 4 g of the powder $I_1$. The vessel containing this suspension was immersed in a thermostatic water bath kept at 50° C., and the suspension was stirred at 600 rpm. Simultaneously with initiation of the stirring, ultrasonic irradiation was initiated.

At the time when the temperature of the suspension had reached 50° C., a given amount, 149 g (144 mL), of the aqueous titanium sulfate solution used in Example 6 was added dropwise thereto at a rate of 0.5 mL/min. After completion of the dropwise addition, stirring was continued for further 90 minutes to form a titania film on the powder $I_1$.

After the lapse of the given time period, the slurry containing the powder on which a titania film had been formed was repeatedly decanted using sufficient ion-exchanged water to wash the powder. After completion of the washing operation, the slurry containing the powder on which a titania film had been formed was dried at 110° C. for 8 hours to obtain a silica/titania-coated magnetite powder $I_2$.

The powder $I_2$ obtained was dark-blue because titania particles were not adherent to the surface thereof. It had a maximum reflectance of 15% at 400 nm. In the L*,a*,b* standard color system, L*=40.8, a*=−1.2, and b*=−6.1 as shown in Table 1.

TABLE 1

Found values for each sample in L*, a*, b* standard color system

| Example | Sample | L* | a* | b* |
| --- | --- | --- | --- | --- |
| 1 | $A_2$ | 72 | 1.1 | 1.2 |
| 2 | $B_3$ | 73 | 1.5 | 1.2 |
| 3 | $C_2$ | 72 | 1.5 | −0.7 |
| 3 | $C_4$ | 86 | 0.7 | 0.9 |
| 4 | $D_3$ | 77 | 0.6 | −0.6 |
| 5 | $E_3$ | 74 | 0.6 | 0.3 |
| 5 | $E_5$ | 89 | 0.2 | −0.2 |
| 6 | $F_2$ | 88.2 | −0.4 | −4.5 |
| 7 | $G_2$ | 66 | 0.4 | −0.2 |
| 8 | $H_3$ | 77 | 0.4 | −1.0 |
| Comparative Example 1 | $I_2$ | 40.8 | −1.2 | −6.1 |

The powders obtained in Examples 1 to 8 given above each had a high value of L* in the standard color system and had a high whiteness. In particular, the powder of Example 6 showed enhanced scattering reflection because existing fine particles having a relatively large particle diameter had been used as the fine particles for forming a film constituted of crystallized fine particles. Consequently, the L* value of the powder of Example 6 in the standard color system was as large as 88.2 although the coating thereof was a two-layer film.

EXAMPLE 9

White Powder Employing Flaky Magnetic Material Formation of Silica Film As First Layer Thirty grams of a flaky barium ferrite powder having an average particle diameter of 2.8 μm was added to 800 mL of the buffer solution 3 prepared beforehand, and sufficiently dispersed therein. The vessel containing this buffer solution was placed in the water tank of an ultrasonic washer (Type US-6, manufactured by Iuchi Seieido K.K.) of 200 W and 28 kHz, and the suspension was stirred. Simultaneously with the stirring, ultrasonic irradiation was conducted. Subsequently, 430 mL of 5 wt % aqueous sodium silicate solution was added dropwise thereto at a rate of 80 mL/min to gradually react and decompose the silicate. Thus, a silica film was deposited on the surface. After completion of the dropwise addition of the aqueous sodium silicate solution, the mixture was reacted for further 2 hours to react all the unreacted starting material.

After completion of the film-forming reaction, the slurry containing the powder on which a silica film had been formed was repeatedly decanted using sufficient ion-exchanged water to wash the powder. After the washing operation, the powder on which a silica film had been formed was placed in a vat, and the powder was allowed to sediment and separate. The supernatant was discarded, and the residue was dried with a drying oven at 130° C. for 8 hours and then heat-treated in nitrogen gas for 30 minutes to obtain a silica-coated flaky barium ferrite powder $J_1$.

Formation of Film Constituted of Crystallized Fine Particles (Scattering Fine-particle Film) As Second Layer Twenty grams of the silica-coated flaky barium ferrite powder $J_1$ and 14 g of fine titanium oxide particles (CR-50) were added to 800 mL of the buffer solution 3, and sufficiently dispersed therein. The vessel containing this buffer solution was placed in the water tank of an ultrasonic washer (Type US-6, manufactured by Iuchi Seieido K.K.) of 200 W and 28 kHz, and the suspension was stirred. Simultaneously with the stirring, ultrasonic irradiation was conducted. Subsequently, 490 mL of 5 wt % aqueous sodium silicate solution was added dropwise thereto at a rate of 80 mL/min to gradually react and decompose the silicate. Thus, a silica film was deposited on the surface. After completion of the dropwise addition of the aqueous sodium silicate solution, the mixture was reacted for further 2 hours to react all the unreacted starting material.

After completion of the film-forming reaction, the slurry containing the powder on which a silica film had been formed was repeatedly decanted using sufficient ion-exchanged water to wash the powder. After the washing operation, the powder on which a silica film had been formed was placed in a vat, and the powder was allowed to sediment and separate. The supernatant was discarded, and the residue was dried with a drying oven at 130° C. for 8 hours and then heat-treated in nitrogen gas for 30 minutes to obtain a silica/titania-coated flaky barium ferrite powder $J_2$.

The powder $J_2$ obtained had a magnetization of 20 emu/g at 1 kOe, and L* in the L*,a*,b* standard color system was 67 as shown in Table 2.

EXAMPLE 10

White Powder Employing Flaky Magnetic Material Formation of Silica Film As First Layer Thirty grams of a flaky barium ferrite powder having an average particle diameter of 2.8 μm was added to 800 mL of the buffer solution 3 prepared beforehand, and sufficiently dispersed therein. The vessel containing this buffer solution was placed in the water tank of an ultrasonic washer (Type US-6, manufactured by Iuchi Seieido K.K.) of 200 W and 28 kHz, and the suspension was stirred. Simultaneously with the stirring, ultrasonic irradiation was conducted. Subsequently, 5 wt % aqueous sodium silicate solution was added dropwise thereto at a rate of 80 mL/min to gradually react and decompose the silicate. Thus, a silica film was deposited on the surface. After completion of the dropwise addition of the aqueous sodium silicate solution, the mixture was reacted for further 2 hours to react all the unreacted starting material.

After completion of the film-forming reaction, the slurry containing the powder on which a silica film had been formed was repeatedly decanted using sufficient ion-exchanged water to wash the powder. After the washing operation, the powder on which a silica film had been formed was placed in a vat, and the powder was allowed to sediment and separate. The supernatant was discarded, and the residue was dried with a drying oven at 130° C. for 8 hours and then heat-treated in nitrogen gas for 30 minutes to obtain a silica-coated flaky barium ferrite powder $K_1$.

Formation of Film Constituted of Crystallized Fine Particles (Scattering Fine-particle Film) As Second Layer Twenty grams of the silica-coated flaky barium ferrite powder $K_1$ and 14 g of fine titanium oxide particles (CR-50) were added to a solution prepared by mixing 1,444 mL of the buffer solution 4 with 1,900 mL of pure water, and sufficiently dispersed therein. The vessel containing this buffer solution was placed in the water tank of an ultrasonic washer (Type US-6, manufactured by Iuchi Seieido K.K.) of 200 W and 28 kHz, and the suspension was stirred. Simultaneously with the stirring, ultrasonic irradiation was conducted. Subsequently, 460 mL of 5 wt % aqueous titanyl sulfate solution was added dropwise thereto at a rate of 4 mL/min to gradually react and decompose the sulfate. Thus, a titania film was deposited on the surface. After completion of the dropwise addition of the aqueous titanyl sulfate solution, the mixture was reacted for further 2 hours to react all the unreacted starting material.

After completion of the film-forming reaction, the slurry containing the powder on which a titania film had been formed was repeatedly decanted using sufficient ion-exchanged water to wash the powder. After the washing operation, the powder on which a titania film had been formed was placed in a vat, and the powder was allowed to sediment and separate. The supernatant was discarded, and the residue was dried with a drying oven at 130° C. for 8 hours and then heat-treated in nitrogen gas for 30 minutes to obtain a silica/titania-coated flaky barium ferrite powder $K_2$.

The powder $K_2$ obtained had a magnetization of 18 emu/g at 1 kOe, and $L^*$ in the $L^*,a^*,b^*$ standard color system was 77 as shown in Table 2.

EXAMPLE 11

Three-layer Coating from Aqueous System Using Dry-coated Magnetic Material

One kilogram of an iron powder having an average particle diameter of 1.8 $\mu$m and 1.5 kg of titanium oxide particles having an average particle diameter of 0.2 $\mu$m were subjected three times to 5-minute dry mixing/pulverization using a mechanofusion apparatus manufactured by Hosokawa Micron Corp. The formation of a film was ascertained. Thus, a titanium oxide-coated iron powder $L_1$ having improved lightness was obtained.

With 212 mL of buffer solution 3 prepared beforehand was mixed 212 mL of pure water also prepared beforehand. Thereto was added 15 g of $L_1$. After this mixture was sufficiently mixed, 134 ml of a water glass solution having an $SiO_2$ content of 10 wt % was gradually added dropwise to the mixture with stirring over 3 hours. Thereafter, reaction was continued for 1 hour. After the reaction, solid/liquid separation was conducted by decantation, and the powder was dried with a vacuum dryer for 8 hours and then heat-treated with a rotary tubular oven in a nitrogen atmosphere at 500° C. for 30 minutes to obtain a silica/titania-coated iron powder $L_2$.

Furthermore, 4 g of the silica/titania-coated iron powder $L_2$ was sufficiently dispersed into 446 mL of buffer solution 4. Thereafter, 35 mL of aqueous titanyl sulfate solution having a $TiO_2$ content of 15 wt % was added dropwise thereto over 4 hours. After completion of the dropwise addition, the reaction mixture was reacted for further 1 hour to eliminate the unreacted reactant. After the reaction, solid/liquid separation was conducted by decantation, and the powder was dried with a vacuum dryer for 8 hours and then heat-treated with a rotary tubular oven in a nitrogen atmosphere at 500° C. for 30 minutes to obtain a silica/titania-coated iron powder $L_3$.

The $L^*$ of this powder $L_3$ in the $L^*,a^*,b^*$ standard color system was 81 as shown in Table 2. Furthermore this powder had magnetizations of 32.1 emu/g and 95 emu/g in magnetic fields of 1 kOe and 10 kOe, respectively.

EXAMPLE 12

White Powder Employing Flaky Conductive Material; Three-layer Coating by Hydrolysis of Metal Alkoxide Coloring by First Layer Coating Fifteen grams of a coated flaky aluminum powder having an average particle diameter of 12 $\mu$m ($L^*$=80) was sufficiently dispersed in 160 g of ethanol. Thereafter, 7.0 g of titanium isopropoxide was added thereto and this mixture was sufficiently mixed. A solution prepared beforehand by mixing 12.0 g of water with 160 g of ethanol was then added dropwise thereto and the resultant mixture was reacted for 5 hours. After the reaction, solid/liquid separation was conducted by decantation, and the powder was dried with a vacuum dryer for 8 hours and then heat-treated with a rotary tubular oven in a nitrogen atmosphere at 500° C. for 30 minutes to obtain a titania-coated flaky aluminum powder $M_1$.

The $L^*$ of this powder in the $L^*,a^*,b^*$ standard color system was 90 as shown in Table 2.

Second Layer Coating

Fifteen grams of the titania-coated flaky aluminum powder $M_1$ was sufficiently dispersed into 160 g of ethanol. Thereafter, 11.7 g of silicon ethoxide was mixed therewith. Thereto were further added 11.7 g of water and 15.5 g of ammonia water. This mixture was reacted for 3 hours with stirring at ordinary temperature. After the reaction, solid/liquid separation was conducted by decantation, and the powder was dried with a vacuum dryer for 8 hours and then heat-treated with a rotary tubular oven in a nitrogen atmosphere at 500° C. for 30 minutes to obtain a silica/titania-coated flaky aluminum powder $M_2$.

Coating with Colored Film As Third Layer

Fifteen grams of the silica/titania-coated flaky aluminum powder $M_2$ was sufficiently dispersed into 160 g of ethanol. Thereafter, 9.2 g of titanium isopropoxide was added thereto and this mixture was sufficiently mixed. Furthermore, a solution prepared beforehand by mixing 15.6 g of water with 60 g of ethanol was added dropwise thereto and the resultant mixture was reacted for 5 hours. After the reaction, solid/liquid separation was conducted by decantation, and the powder was dried with a vacuum dryer for 8 hours and then heat-treated with a rotary tubular oven in a nitrogen atmosphere at 500° C. for 30 minutes to obtain a silica/titania-coated flaky aluminum powder $M_3$.

The $L^*$ of this powder $M_3$ in the $L^*,a^*,b^*$ standard color system was 101 as shown in Table 2.

TABLE 2

Found values for each sample in L*, a*, b* standard color system

| Example | Sample | L* | a* | b* |
|---|---|---|---|---|
| 9 | J$_2$ | 67 | 0.9 | 1.5 |
| 10 | K$_2$ | 77 | 0.8 | 1.2 |
| 11 | L$_3$ | 81 | 0.7 | 1.8 |
| 12 | M$_2$ | 90 | −0.2 | 1.3 |
| 12 | M$_3$ | 101 | −0.2 | 1.4 |

The powders obtained in Examples 9 to 12 given above each had a high value of L* in the standard color system and had a high whiteness.

Industrial Applicability

As described above, according to the white powder of the invention and the process for producing the same, one or more coating films are formed on the surface of base particles and at least one of the coating films is a layer comprising crystallized fine particles and an aggregate of crystallized fine particles which has voids among the crystallized fine particles. Due to this constitution, the coating film has a large difference in refractive index between the surface of the crystallized particles and the voids to thereby cause the scattering reflection of light and enhance a reflective effect. It has thus become possible to provide a functional powder having excellent lightness (whiteness).

Furthermore, in forming a film constituted of crystallized ultrafine particles, use can be made of a method in which existing particles are incorporated into the film, besides the method in which ultrafine particles scatteringly reflecting visible light are formed in a liquid by regulating the rate of solid-phase deposition. Thus, a white powder having higher lightness can be yielded because the crystallized ultrafine particles contained in the film formed by the former method tend to have a relatively large particle diameter and, hence, cause a higher degree of scattering reflection.

Besides having these excellent functions, the white powder can take advantage of a magnetic material, conductive material, or dielectric as the base to thereby respond to an external factor such as an electric field or magnetic field. The white powder can hence have an additional function of mobility, rotation, movement, heat generation, etc. For example, when a magnetic material is used as the base, the white powder is applicable as a pigment for color magnetic toners or color magnetic inks.

What is claimed is:

1. A white powder comprising base particles having on the surface thereof at least one coating film comprising a crystallized-particle aggregate which imparts a white color based on the scattering reflection of light and which comprises crystallized particles and has voids among the crystallized particles, and having, on the surface of the at least one coating film, an another coating film comprising particles filling up the voids present in said surface.

2. A white powder comprising base particles having on the surface thereof at least one coating film comprising a crystallized-particle aggregate which comprises crystallized particles and has voids among the crystallized particles, and that a white color is imparted thereto based on the scattering reflection of light occurring between the surface of the crystallized particles and the voids, and having, on the surface of the at least one coating film, an another coating film comprising particles filling up the voids present in said surface.

3. The white powder of claim 1 or 2, wherein the crystallized particles are ones irregular in particle diameter.

4. The white powder of claim 1 or 2, wherein the at least one coating film is a multilayered film.

5. The white powder of claim 1 or 2, wherein the at least one coating film is a high-refractive-index film.

6. The white powder of claim 1 or 2, wherein the another coating film comprising particles filling up the voids present in said surface is a silica film or a titania film.

7. The white powder of claim 1 or 2, wherein the coating film is one formed by forming solid-phase particles in an aqueous solution to coat the base particles with the solid-phase particles and then burning the coated base particles.

8. The white powder of claim 7, wherein before the burning is conducted, the coating layer is coated with particles constituting a film which fills up the voids present in the surface of the coating layer.

9. The white powder of claim 1 or 2, wherein the coating layer is one formed by adhering crystallized particles to the surface of a base powder in a liquid containing the crystallized particles and the base powder dispersed therein.

10. A process for producing a white powder, comprising coating the surface of base particles with at least one coating film comprising a crystallized-particle aggregate which imparts a white color based on the scattering reflection of light and which comprises crystallized particles and has voids among the crystallized particles, and coating the surface of the at least one coating layer with an another coating film comprising particles filling up the voids present in said surface.

11. A process for producing a white powder, comprising coating the surface of base particles with at least one coating film comprising a crystallized-particle aggregate which comprises crystallized particles and has voids among the crystallized particles to thereby impart a white color thereto based on the scattering reflection of light occurring between the surface of the crystallized particles and the voids, and coating the surface of the at least one coating layer with an another coating film comprising particles filling up the voids present in said surface.

12. The process of claim 10 or 11, wherein the crystallized particles are ones irregular in particle diameter.

13. The process of claim 10 or 11, wherein the at least one coating film is a multilayered film.

14. The process of claim 10 or 11, wherein the at least one coating film is a high-refractive-index film.

15. The process of claim 10 or 11, wherein the another coating film comprising particles filling up the voids present in said surface is a silica film or a titania film.

16. The process of claim 10 or 11, comprising forming solid-phase particles in an aqueous solution to coat the base particles with the solid-phase particles and then burning the coated base particles to thereby form the coating film.

17. The process of claim 16, wherein before the burning is conducted, the coating film is coated with particles constituting a film which fills up the voids present in the surface of the coating film.

18. The process of claim 10 or 11, wherein the coating layer is one formed by adhering crystallized particles to the surface of a base powder in a liquid containing the crystallized particles and the base powder dispersed therein.

* * * * *